Figure 1:
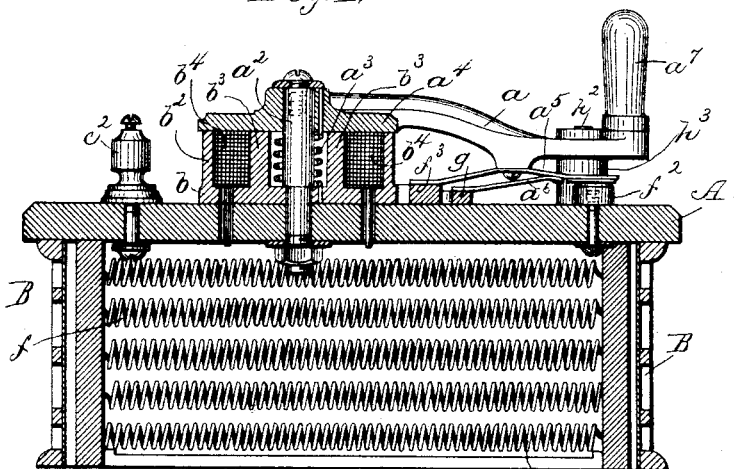

(No Model.)

D. M. BLISS.
STARTING BOX FOR ELECTRIC MOTORS.

No. 539,376. Patented May 14, 1895.

Witnesses
Jas. J. Maloney.
J. P. Livermore.

Inventor
Donald M. Bliss,
by Jo. P. Livermore
Att'y.

UNITED STATES PATENT OFFICE.

DONALD M. BLISS, OF BOSTON, MASSACHUSETTS, ASSIGNOR TO THE HOLTZER-CABOT ELECTRIC COMPANY, OF SAME PLACE.

STARTING-BOX FOR ELECTRIC MOTORS.

SPECIFICATION forming part of Letters Patent No. 539,376, dated May 14, 1895.

Application filed February 20, 1895. Serial No. 539,075. (No model.)

*To all whom it may concern:*

Be it known that I, DONALD M. BLISS, of Boston, county of Suffolk, State of Massachusetts, have invented an Improvement in Starting-Boxes for Electric Motors, of which the following description, in connection with the accompanying drawings, is a specification, like letters and figures on the drawings representing like parts.

The present invention relates to what is known as a starting box or rheostat such as is commonly used in connection with electric motors to prevent an abnormal flow of current through the coils of the motor before speed enough has been attained to develop the proper amount of counter electromotive force.

The starting box which forms the subject of this invention is of that class commonly known as automatic starting boxes or those in which means are provided for automatically restoring the switch to its initial position, if for any reason the current in the main circuit is interrupted. Thus if the current is interrupted and again restored without the knowledge of the attendant who is taking care of the motor, the said motor will be cut out and cannot again be restarted without operating the switch belonging to the starting box. Such starting boxes have been usually constructed with a switch adapted to successively short circuit or cut out resistance coils arranged in series, the said switch being provided with a spring or similar device for retaining it in initial or "off" position or restoring it thereto when not otherwise held in some other position. In order to retain the said switch in its final or "on" position an electro magnet is provided, energized by the current flowing through the circuit in which the motor is installed, and an armature connected to or co-operating with the switch handle is adapted when the said switch is in its final or "on" position to come within the field of force of the said magnet and thus be retained thereby against the stress of its restoring spring. Obviously if the current fails owing to a break in the circuit or other cause the magnet will become demagnetized so that it no longer retains the switch in its "on" position, the said switch being automatically thrown off by its restoring device. The electro magnet employed in connection with the starting box embodying the present invention is constructed and arranged in a novel way and in such relation to its armature, which is connected to or co-operative with the movable member of the switch, that instead of said magnet and armature being in inductive proximity only at one extreme position of the switch, they are constantly in inductive proximity and so adjusted that the force of attraction between them will result in their engaging each other so that the movable member of the switch is held stationary against the force of its restoring spring, the relation of said parts being the same at all positions of the said movable member. This obviously enables the device to be used not only as starting box but if desired also as a rheostatic controller for the motor, which has not been practicable with constructions heretofore in use. If, however, it is desired to have the switch held by the magnet only in its extreme position a shunt circuit may be provided therefor, the switch contacts being so arranged that the said shunt is opened only when the switch reaches its extreme position.

Figures 2, 3:
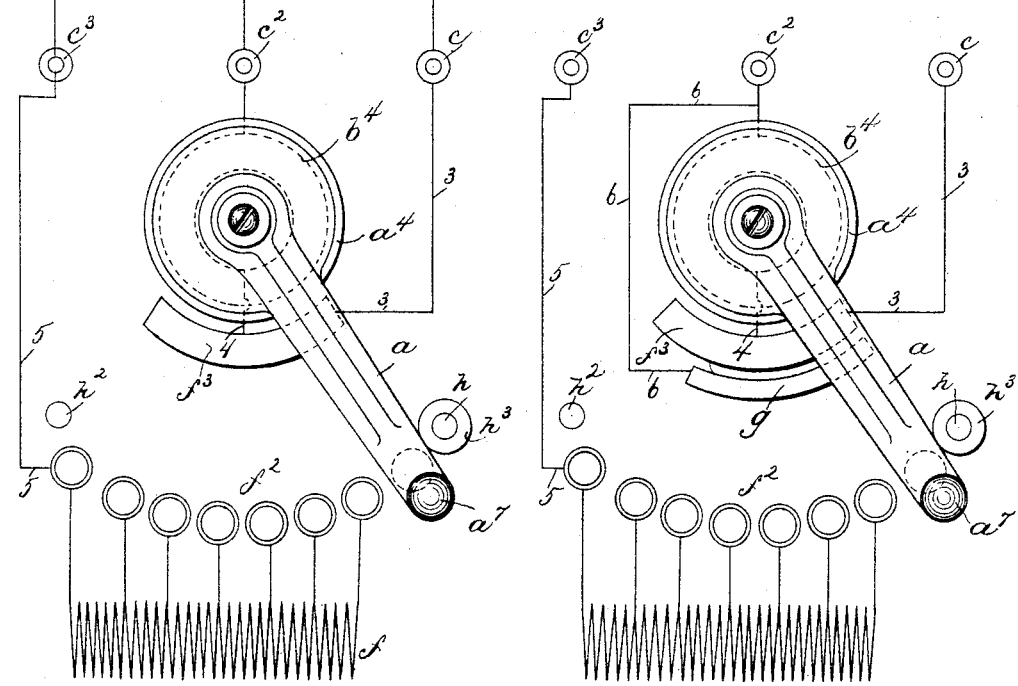

Figure 1 is a sectional elevation showing the mechanical construction and arrangement of the device. Fig. 2 is a diagram of circuits, and Fig. 3 is a similar diagram of a modification in which a shunt is provided around the magnet-coils.

Referring to Fig. 1, the switch arm $a$ or movable member of the switch is suitably mounted as by a spindle $a^2$ upon a base A and is provided with a restoring device tending to hold it in its initial or "off" position (Fig. 2,) the said restoring device in this case being shown as a spring $a^3$ surrounding the pin or spindle $a^2$ and connected at one end to the base and at the other end to the switch arm $a$. Surrounding the said spindle $a^2$ is a cylindrical box or casting $b$ of iron or other magnetic material having outer and inner annular walls $b^2$ and $b^3$ concentric with the said spindle $a^2$, and between the said walls is a coil $b^4$ connected in circuit as will be hereinafter described. The ends of the walls $b^2$, $b^3$, thus form the poles of an electro magnet energized by current flowing through said coil $b^4$. A circular plate or enlargement $a^4$ co-operating with or preferably integral with the switch arm as shown fits over the top of the cylindrical shell $b$ thus inclosing and protecting the coil as well as the restoring spring and at the same time forming an armature for the said electro magnet which is obviously constantly attracted thereby while current is flowing through the coils regardless of the position of the switch handle.

The strength of the restoring spring $a^3$ is so adjusted as to be insufficient to overcome the friction developed by the attraction between the said magnet and armature while the said friction is not sufficiently great to preclude the movement of the switch handle by the operator. Thus as long as the magnet is energized the switch handle $a$ will remain in any position desired, but if the magnet ceases to be energized the said handle will be restored at once to its "off" position Fig. 2, by the action of the spring $a^3$. As shown in the present instance the magnet and armature are substantially in actual contact, but this construction obviously is not essential as it is necessary only that the said parts be in inductive proximity to each other at all positions in the movement of the switch arm and capable of holding said armature and switch arm stationary through the pressure or engagement developed by the force of attraction due to magnetic influence.

The resistance box as shown in the present instance is arranged for a shunt wound motor in which the field is constantly in circuit after the switch has left the "off" position, resistance being introduced in the armature circuit alone.

Binding posts $c, c^2, c^3$, are provided and connected respectively with wire X of the main circuit, the field $d$ of the motor and the armature $e$ of the motor, the circuit being completed by the connection from said field and armature in shunt to the opposite wire Y of the main circuit. The resistance box or rheostat itself is constructed in the usual way with a series of resistance coils $f$ which may be as shown in Fig. 1, a series of steel springs inclosed in a ventilated casing B so that the heat generated therein may be dissipated, thus tending to prevent possible damage from overheating. A series of contacts $f^2$ connected with the said coils are arranged preferably on the arc of a circle as shown and in the path of the spring contact $a^5$ Fig. 1, which is connected to the switch arm $a$. The said spring contact extends from the point at which it can successively engage the said contact buttons $f^2$ across to a segmental contact $f^3$ which is connected by a conductor 3 to the binding post $c$. The said contact is also connected by a conductor 4 to one terminal of the coil $b^4$ the other terminal thereof leading to the binding post $c^2$ which as has been mentioned above is connected to the field of the motor. The last of the contacts $f^2$ is connected by the conductor 5 to the binding post $c^3$ which leads to the armature of the motor. Thus when the switch is moved from its normal or "off" position, shown, to a position in which the contact $a^5$ rests upon the first of the contacts $f^2$ the circuit may be traced from the wire X to the binding post $c$, and wire 3 to the contact $f^3$, where it divides, the field current passing through the wire 4, coil $b^4$, binding post $c^2$, field $d$, and thence to the conductor Y on the main circuit. The other branch passes from contact $f^3$ to contact $f^2$ through resistance $f$, conductor 5, and binding post $c^3$ to the armature $e$ and thence to the conductor Y of the main circuit.

It will be seen by referring to Fig. 2, that as the switch is moved from the right hand position in which it is shown to the extreme left hand position in which it rests upon the last of the contacts $f^2$, the resistance is gradually short circuited until finally the entire uninterrupted current passes to the motor armature without encountering any resistance.

Since the full current is continually flowing through the coil $b^4$ as above described, the electro magnet will be fully energized and will therefore attract its armature developing sufficient friction to hold the switch in any desired position against the stress of its restoring spring so long as the current in the main circuit is uninterrupted. The switch may therefore be moved to any point to control the speed of the motor by cutting in or out more or less resistance, and at the same time in any position will be automatically returned to the off position if the current in the main circuit fails for any reason, thus de-energizing the magnet so that it no longer holds its armature in frictional contact with its poles, and allowing the restoring spring to operate.

It may be desirable in some cases to use this device solely as a starting box in which event it is better that the electro magnet should not be energized except when the switch is in its extreme "on" position since the switch may thus be more easily operated in starting the motor. To accomplish this, an additional segmental contact $g$ (Fig. 3) parallel to the contact $f^3$ but somewhat shorter than the said contact $f^3$ may be added, and connected by a conductor 6 to a point in the circuit beyond the magnet coil $b^4$ thus affording, when the said contact $g$ is connected to the contact $f^3$, a shunt or short circuit for the said coil. In this case, an additional spring contact $a^6$, Fig. 1, is secured to and conductively connected with the spring contact $a^5$ and bears upon the segment $g$ thus connecting the segment $g$ with the segment $f^3$ so that when the current divides at $g$ one branch of the circuit goes through the resistance to the armature as described, and the other branch through the shunt 6 to the field, instead of through the coil $b^4$. The segment $g$, however, is made shorter as above mentioned, than the segment $f^3$ so that when the switch is thrown to the extreme left, Fig. 3, the spring contact $a^6$ passes beyond the end of the said segment $g$ and out of contact therewith so that the shunt 6 is cut out leaving the circuit substantially as shown and described in connection with Fig. 2.

Suitable stops $h$, $h^2$, are provided at the ends of the series of contacts $f^2$ which limit the movement of the switch, the stop $h$ being preferably surrounded with a band of rubber or some such yielding material $h^3$ since the switch handle when automatically restored by the stress of its spring strikes against the said stop with considerable force, and it should therefore be cushioned.

A suitable insulating handle $a^7$ is provided for the switch and mounted to operate the same.

It is not intended to limit the invention specifically to the exact form and construction herein shown and described, since obvious modifications might be made.

I claim—

1. A rheostat comprising contacts successively connected with a series resistance, a movable switch member adapted to cooperate with said contacts, an armature cooperating with said switch member, and a stationary electro magnet having its entire polar face adjacent to the path of movement of said armature whereby the said armature and switch member may be locked by the attraction of said magnet in any position of said switch member, substantially as described.

2. The combination with the rheostat having an adjustable resistance in series with the armature of the motor and a direct connection with the field thereof, of an electro magnet in series with the said field connection; a switch arm pivoted concentrically with the poles of said magnet and substantially in contact therewith, and a restoring device for said switch arm, whereby the said switch arm is moved to a predetermined position when not held by the attraction of the said electro magnet in engagement therewith, as described.

3. The combination with a rheostat, of an electro-magnet comprising a coil wound between concentric cylindrical poles, a switch member movable on an axis concentric with said poles, and an armature connected to or integral with said switch member and adjacent to said poles, substantially as described.

In testimony whereof I have signed my name to this specification in the presence of two subscribing witnesses.

DONALD M. BLISS.

Witnesses:
H. J. LIVERMORE,
M. E. HILL.